(12) United States Patent
Siewert

(10) Patent No.: US 10,501,205 B1
(45) Date of Patent: Dec. 10, 2019

(54) DRONE DELIVERY INTERFACE

(71) Applicant: Bradley Siewert, Shingle Springs, CA (US)

(72) Inventor: Bradley Siewert, Shingle Springs, CA (US)

( * ) Notice: Subject to any disclaimer, the term of this patent is extended or adjusted under 35 U.S.C. 154(b) by 536 days.

(21) Appl. No.: 15/138,468

(22) Filed: Apr. 26, 2016

Related U.S. Application Data

(60) Provisional application No. 62/153,362, filed on Apr. 27, 2015.

(51) Int. Cl.
*B64F 1/00* (2006.01)
*B64D 1/02* (2006.01)
*B64D 1/22* (2006.01)

(52) U.S. Cl.
CPC .............. *B64F 1/00* (2013.01); *B64D 1/02* (2013.01); *B64D 1/22* (2013.01); *B64C 2201/128* (2013.01)

(58) Field of Classification Search
CPC .... B64F 1/00; B64D 1/02; B64D 1/08; B64D 1/12; B64D 1/22; B64C 2201/128
USPC ...................... 244/114 R, 115, 116
See application file for complete search history.

(56) References Cited

U.S. PATENT DOCUMENTS

| | | | | |
|---|---|---|---|---|
| 2,656,711 A | * | 10/1953 | Tschudi | G01N 3/303 73/12.06 |
| 5,000,292 A | * | 3/1991 | Chapelain | B66B 19/002 187/408 |
| 5,152,369 A | * | 10/1992 | Nakaoka | B66B 9/187 182/129 |
| 8,899,903 B1 | * | 12/2014 | Saad | B65G 67/00 414/392 |
| 9,387,928 B1 | * | 7/2016 | Gentry | B64C 39/024 |
| 2015/0129716 A1 | * | 5/2015 | Yoffe | B64F 1/02 244/110 C |
| 2015/0158599 A1 | * | 6/2015 | Sisko | B64F 1/32 244/114 R |
| 2015/0175276 A1 | * | 6/2015 | Koster | B64F 1/32 244/114 R |
| 2015/0183528 A1 | * | 7/2015 | Walsh | B64F 1/32 701/3 |
| 2016/0011592 A1 | * | 1/2016 | Zhang | B64C 39/024 701/2 |
| 2016/0101874 A1 | * | 4/2016 | McKinnon | B64F 1/007 244/114 R |
| 2016/0257423 A1 | * | 9/2016 | Martin | B64F 1/00 |

* cited by examiner

*Primary Examiner* — Richard R. Green
*Assistant Examiner* — Brady W Frazier
(74) *Attorney, Agent, or Firm* — Heisler & Associates

(57) ABSTRACT

Packages are delivered from a drone to an upper end of an elongate shaft which in a preferred embodiment has the appearance of a chimney and which can be coupled to a residential structure or provided as a standalone structure. A hollow column extends from an upper end down to a lower end. A chute can allow for a package to pass from the upper end to the lower end or a platform used to carry a package from the upper end to the lower end. Preferably a movable cover selectively overlies the upper end to close off the upper end when not in use and to allow the upper end to be exposed for access to packages from drones. A locker can be provided adjacent to the lower end to provide secure access to packages having been delivered through the interface.

18 Claims, 6 Drawing Sheets

DRONE DELIVERY INTERFACE

CROSS-REFERENCE TO RELATED APPLICATIONS

This application claims benefit under Title 35, United States Code § 119(e) of U.S. Provisional Application No. 62/153,362 filed on Apr. 27, 2015.

FIELD OF THE INVENTION

The following invention relates to landing platforms and other ports for receipt of packages and other objects carried by aircraft by capturing and securing such packages or other objects when released from a flying aircraft. More particularly, this invention relates to interfaces for receipt of packages and other objects from a drone, such as an unmanned aerial vehicle.

BACKGROUND OF THE INVENTION

Remote control vehicles have long been in existence for utilization as toys or for industrial and other commercial purposes. Remote control vehicles can include cars, boats and aircraft. Generally, such remote control vehicles include some form of motive power coupled to a power supply and control elements such as steering elements. The power supply and steering elements are coupled to servo motors or other onboard control devices. The remote control vehicle also includes a transmitter coupled to these servo motors or other controls. Separate from the remote control vehicle, a control device is provided which includes a transmitter that can communicate with the transmitter onboard the remote control vehicle. The control device includes control inputs (such as for steering) which can be encoded, transmitted to the remote control vehicle, and interpreted as control signals for the servo motors or other controls. Power supply motive power, and steering inputs can thus be provided to the vehicle remotely.

One variation on such remote control vehicles is to at least partially substitute the control device with an at least partially automated control system. With such an at least partially automated control system, the operator need not actively control power and/or steering of the remote control vehicle, but rather merely oversees some details of control of the remote control vehicle, such as a desired final destination for the remote control vehicle. The control system then provides control inputs to move the remote control vehicle from a current location to a final destination.

Such semi-autonomous or fully autonomous remote control vehicles which are in the form of aircraft are often referred to as "drones." Such drones can include fixed wing aircraft, but most typically include one or more propellers mounted to a body. A control system is typically provided which controls at least some of the aspects of flight of the drone. For instance, a control system can be provided to maintain an attitude of the drone being approximately upright and stationary unless inputs into the control system call for movement of the drone to a new location. Altitude of the drone can also be maintained by such a control system unless inputs direct the drone to adjust elevation. An operator thus need not be actively involved in stabilizing the drone, but merely provides inputs to move the drone from one location to another.

More recently it has been proposed and to some extent implemented for drones to travel from a start location to a finish location in a pre-programmed fashion. For instance, packages can be delivered from a warehouse or other start location to a customer or other finish location by having the drone pick up the package (with or without human intervention) at the start location and then fly a course from the start location to the finish location. The package can then be dropped off and the drone typically returns to the start location, such as for refueling, maintenance and/or collection of other packages for further deliveries.

Significant portions of the world's transportation infrastructure are occupied in the transportation of packages and other items from a start location to a finish location. In many instances these packages are relatively lightweight and relatively small. To deliver such packages as efficiently as possible, especially for goods that are in relatively high demand, warehouses are provided throughout the country which can store an assortment of such items. When a customer requests such an item, the item is put into a package (if needed), provided with shipping information and loaded onto a truck or other vehicle. Delivery personnel drive the truck along a route and drop off packages at the addresses identified thereon. While such package delivery is generally effective, it requires the fuel and maintenance of the delivery vehicle, occupies a portion of the transportation infrastructure and requires a driver to transport the vehicle from the warehouse or other origin to the customer or other delivery location.

While replacement of delivery of at least some relatively small and relatively lightweight packages with delivery by drone has been proposed, and to some extent implemented at least on an experimental basis, problems remain to be overcome. One particular problem is how to safely finish the delivery of a package from a drone to a customer without damage to the package, the drone, or property or personnel at the delivery location. Drones typically include multiple propellers, which can be ducted to provide some protection, but still present an opportunity for injury to personnel or to the drone itself, or adjacent property. When the drone travels low to the ground for final package delivery, there is an opportunity for individuals to attempt to tamper with the drone.

In some instances the drone merely delivers packages to a "backyard" of a residence. However, not all addresses have such a "backyard" and still the necessity to navigate around obstacles such as trees and a house, must occur for safe drone delivery of a package. Furthermore, if the package is merely dropped into a backyard location, the package is susceptible to damage upon landing too hard, or to the elements, such as being exposed to the rain, or excessive sunlight, temperature, etc. Accordingly, a need exists for a suitable reliable receptacle to which packages can be conveniently delivered from a drone to overcome the aforementioned problems.

SUMMARY OF THE INVENTION

With this invention, a drone delivery interface is provided and associated system to provide a safe and reliable location for a drone to deliver a package (or other object), safe both for the drone and for the package. The interface includes a primary structure referred to as a chimney/shaft because in many embodiments it is caused to look like a chimney of a standard residential home (but could in alternative embodiments have an appearance which is elongate and typically substantially vertical but not necessarily appearing to be a chimney). By making the interface appear as a chimney, local regulations relating to acceptable appearance on an exterior of a house can be properly addressed.

This chimney/shaft could in one embodiment be attached to a house, typically along an outer surface thereof, but optionally within an interior portion thereof, and with an upper end thereof typically extending above a highest portion of the house, but at least extending above highest portions of a house close to the chimney/shaft. In another embodiment, the chimney/shaft can be separate from the house and have an appearance similar to that of an outdoor fireplace (or optionally not appear as a fireplace at all). While in a primary embodiment the chimney/shaft has only a single shaft extending from an upper end down to an access port at a lower end, the chimney/shaft could have two columns therein, one of which is provided for a drone delivery interface and a second column which can function as an actual chimney for exhaust gases of an actual fireplace, so that the structure is dual purpose.

The drone itself could be any of a variety of different drones (e.g. unmanned aerial vehicles) suitable for package delivery. Such drones would typically have at least one rotor, but most commonly multiple such rotors coupled to a central body. Some form of grapple or other holder extends down from the central body to a package, or the package is contained within some form of storage bay within the body. The drone can have the motors mounted on rotatable structures, or utilize differential thrust from a power supply to the propellers to control pitch roll and yaw of the drone, as well as translation vertically and horizontally in all directions. With this invention, the drone includes at least one sensor in the form of a proximity sensor, and most preferably and in the embodiment disclosed, multiple sensors. In one embodiment four such sensors are provided. These proximity sensors coordinate with sensors (or indicia that can be sensed by the drone sensors) on the drone delivery interface to allow the package to be delivered where desired.

The chimney/shaft of this invention has an upper portion in the form of a cover. This upper portion in a preferred embodiment appears similar to a top of a chimney. The cover is a movable structure suspended above a rail, track or other support surface which defines a transition between the cover and stationary portions of the chimney/shaft below the cover. In a preferred embodiment, the rail is actually provided in the form of a pair of parallel arcuate rails on opposite sides of a rectangular chimney/shaft. However, in alternative embodiments the chimney/shaft could be circular in cross-section or some other geometric shape with the rails being appropriately modified to define a transition between the cover and stationary portions of the chimney/shaft beneath the cover.

A pivot is provided beneath the cover of the shaft which allows for the cover to be pivotably attached to the stationary portions of the shaft. The cover is attached to the pivot, typically through some form of structure, so that the cover can rotate about the pivot and clear a space between the rails where a package delivery platform can be presented. Two embodiments for pivoting of the cover are disclosed. In one embodiment the entire cover remains together as a single structure and pivots laterally to clear a position at an upper end of the shaft between the rails for package delivery. In a second embodiment, the cover is of a clamshell variety with two halves of the cover splitting and pivoting to expose a space between the rails for package delivery.

Some form of cover movement system would be integrated into the interface between the cover and stationary portions of the shaft. In one embodiment movement of the cover is caused by a motor coupled at least indirectly to a shaft at a lower end of the structure supporting the cover and extending along the pivot. To keep the central portions of the shaft open for movement of the platform up and down therein, this pivot axle can be in the form of two short axles on either side of this central shaft, with at least one of these short axles driven by the motor. This motor is typically controlled remotely by the drone or by sensing that the drone is present.

Portions of the cover and shaft come together at the rail which is most preferably an arcuate interface with a radius of curvature similar to a distance between the rail and the pivot. Flashing or other structures are provided adjacent to the rail to protect against water and debris intrusion, such as in rainy windy weather. Furthermore, portions of the shaft adjacent the cover are configured to accommodate at least portions of a structure of the cover to pivot relative thereto in a manner which prevents water intrusion into an interior of the shaft or into a residential structure or other structure to which the shaft is attached.

A platform is provided within the shaft in one embodiment which is movable vertically within the shaft from an access port at a lower end of the shaft up to an upper end of the shaft just below (or alternatively at or above) the rail at the interface between the cover and upper portions of the shaft. The platform preferably has a top surface which is substantially planar. If desired, edges of this top surface can be elevated as a form of perimeter wall to help contain packages dropped onto the top surface which might prevent such a package from falling off of this top surface.

Importantly, the top surface of the platform (or upper portions of the shaft adjacent to the top surface of the platform) is provided with at least one sensor or indicia which can cooperate with sensors on the drone. In the embodiment depicted, four such sensors are provided, one at each corner of the top surface of the platform. The portions of a sensor system on the platform and the portions of the sensor system on the drone are configured to cooperate with each other to provide a form of verification that the drone is at the proper address and that the drone is properly aligned with the upper end of the shaft for delivery of a package onto the top surface of the platform or otherwise into the upper end of the shaft.

In one embodiment, the sensors on the drone use a form of machine vision, such as a barcode scanner or QR code reader type technology. The top surface of the platform merely includes static registration marks, such as in the form of barcodes or QR codes or other registration marks. When the sensors of the drone pick up these registration marks on the top surface of the platform, the drone can align itself with the top surface of the platform, such as by having each of the sensors on the drone aligned as closely as possible with each of the sensors on the platform (such as in the form of registration marks or other indicia) so that the drone is positioned precisely where desired, both vertically above the top surface of the platform and laterally relative to the platform, for optimal package delivery. The package can then be released onto the platform or otherwise into the interface.

In other forms, the registration mark can be in the form of a large symbol, such as a single large "X" on the top surface of the platform, which could be provided of reflective or illuminated paint or other materials. In other embodiments, the sensors on the drone and on the top surface of the platform could be in the form of an RFID (radio frequency identification) system with a scanner as one of the sensors and with an RFID tag as the other sensor. In other embodiments, each sensor can be an active sensor sending out a radio signal and the sensors on the drone can be in the form of receivers which receive the signals from the sensors on the top surface of the platform (or upper portions of the shaft adjacent to the top surface of the platform) for proper alignment of the drone.

In a preferred implementation of the system of this invention, a customer who desires to have a package delivered by drone would initially preferably provide some information such as particular GPS coordinates associated with property of the customer and optionally correlating these GPS coordinates with a street address. In a most preferred embodiment, these GPS coordinates also include the particular location of the upper end of the shaft. This location information most preferably includes both vertical altitude and coordinates such as latitude and longitude. In simpler embodiments, only latitude and longitude information would be associated with the address of the customer.

These coordinates allow the drone to initially come close to the shaft and discriminate the shaft of a desired customer from other similar equipment that neighbors may have (including even residents within a common structure, such as a multi-family dwelling or office building). When the drone comes close to the desired address for delivery, the drone could signal to the shaft its proximity, and the cover would be moved to prepare the upper end of the shaft for receipt of the package. The platform (if being used) would also be raised to an upper position adjacent an upper end of the shaft adjacent to the rail. Sensors on the drone would then cooperate with sensors on or adjacent to the top surface of the platform for precise positioning of the drone over the platform. The package is then released onto the top surface of the platform (or into the upper end if no platform is provided). The drone can then depart.

The platform is preferably movable along a central column of the shaft from an upper end adjacent to the cover down to an access port. This access port is preferably within an interior of the residence, but could be an outdoor access port, such as within a structure appearing similar to an outdoor fireplace. An elevator or other lift structure similar to that of a dumbwaiter is preferably provided to elevate and lower the platform within the open column of the shaft. In one embodiment, this elevation system is in the form of a winch with a cable wrapped on a spool and extending up over a pulley at an upper end of the shaft and with the platform coupled to the cable through an attachment beyond the pulley.

The pulley is rotatably mounted to the upper portions of the shaft while the cable is fixed to the platform at the attachment. Rotation of the winch causes the platform to move up and down. In particular, when the winch plays out cable, the platform moves down. When the winch draws up cable, the platform moves up. If desired, the platform can include guide wheels or other guide structures to keep the platform precisely located within the hollow column inside the shaft.

The access port at a lower portion of the column within the shaft preferably includes a door thereon which can include a lock. Access devices such as keys or combination codes can be utilized by a customer to open the door and allow the package to be removed from the access port by the desired customer.

This package delivery procedure can be reversed for package return. The package is placed on the top surface of the platform within the access port. Communication is sent to the delivery company that a package is available for pickup. When the drone comes close, the package is lifted up by the platform to an upper end of the shaft. The cover is pivoted away from the upper end of the shaft. The drone then approaches, grasps the package, and flies away.

By placing the upper end of the shaft high above the ground the propensity for damage to the drone, property or individuals is greatly reduced. By making the shaft appear as a chimney, the aesthetic nature of structures on or adjacent to the house is not significantly different from that with which neighbors are already familiar.

A height of the shaft most preferably can be adjusted, such as by making mid-portions of the shaft between the cover and the access port modular. For instance, the shaft can be provided prefabricated in four foot tall sections with similar upper and lower interfaces. These modular intermediate sections can be stacked upon a base section in which the access port is located, and be attached together in series with an upper interface of the shaft including the pivot and rail thereon attached to an upper one of these modular intermediate sections. The cover is then attached to this upper interface of the shaft to complete the construction.

With such a modular design, the shaft can be standardized to assist in specification of the device by architects, pre-approval of the shaft by building inspectors and meeting building codes more generally, as well as to allow contractors and other installation personnel to experience a quicker learning curve in repeat installation of similar shaft devices on multiple different residences. An outer surface of the modular shaft can be provided with a variety of pre-selected appearances or can be provided unfinished so that final finish materials can be added thereto in a final step of an installation process.

OBJECTS OF THE INVENTION

Accordingly, a primary object of the present invention is to provide an interface for receipt of a package or other object from a drone in a manner which is secure and safe for the drone and for the package, and for surrounding equipment and personnel.

Another object of the present invention is to provide a drone package delivery interface which can be hidden from view.

Another object of the present invention is to provide a drone package delivery interface which looks like it is a chimney of a residential structure.

Another object of the present invention is to provide a drone package delivery interface which is high enough above ground to make it difficult for vandals to interfere with operation of a drone while delivering a package.

Another object of the present invention is to provide a drone package delivery interface which is sufficiently high above the ground to minimize the potential for collision with trees, power poles, telephone poles and other elevated structures.

Another object of the present invention is to provide a method for receiving a package or other object being delivered from a drone.

Another object of the present invention is to provide a drone delivery interface which can successfully carry a package from an elevated upper end to a lower end having an access port.

Another object of the present invention is to provide a package delivery interface for delivery of packages from a drone which delivers the package into a secure receptacle which can have access thereto restricted to only authorized personnel.

Other further objects of the present invention will become apparent from a careful reading of the included drawing figures, the claims and detailed description of the invention.

DESCRIPTION OF THE PREFERRED EMBODIMENT

Figure 1:
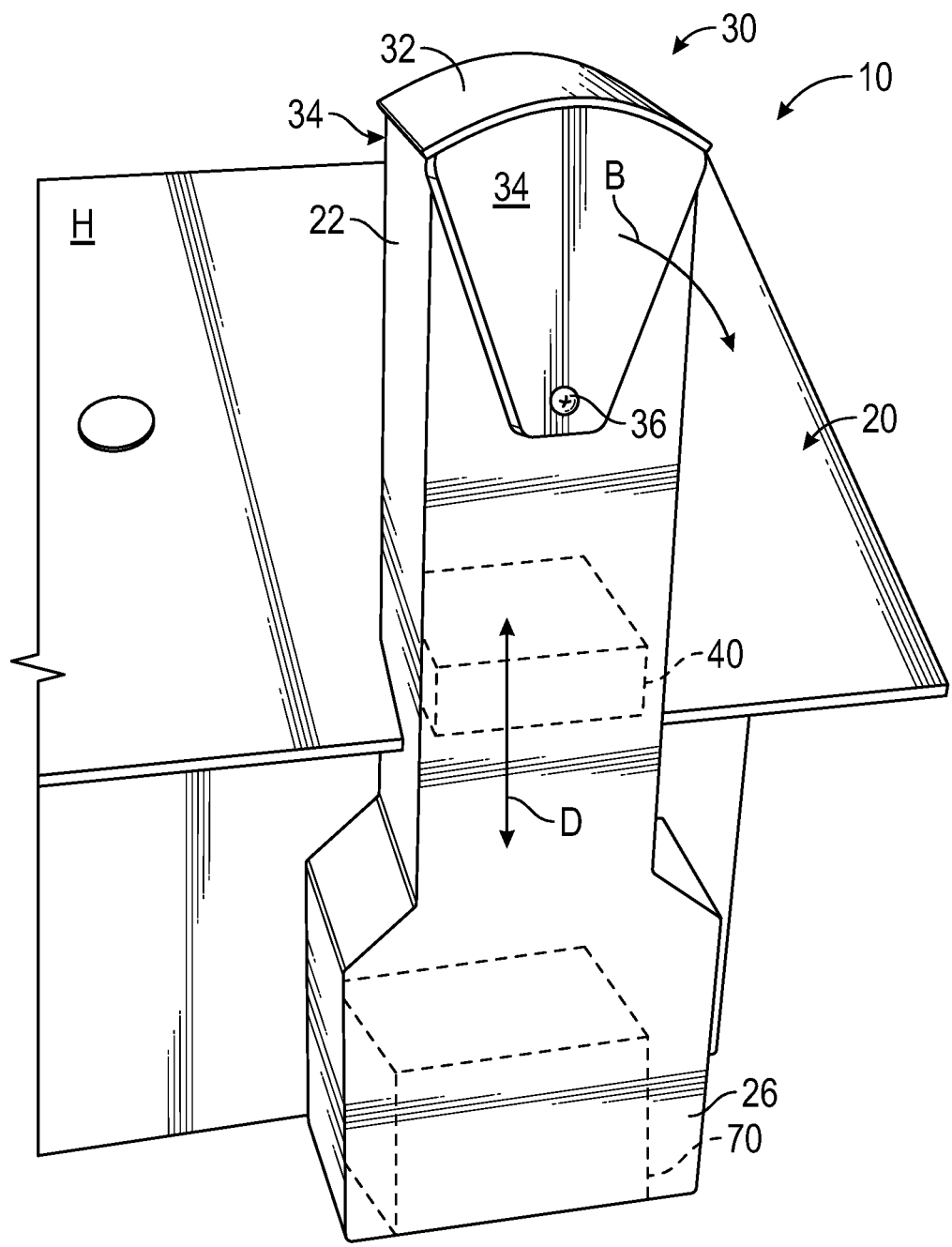
FIG. 1 is a perspective view of a house having a drone delivery interface according to this invention included therein appearing as a chimney, and with a cover thereof shown in a closed position.

Referring to the drawings, wherein like reference numerals represent like parts throughout the various drawing figures, reference numeral 10 (FIGS. 1-5) is directed to an interface which can receive a package P or other object from a drone α, such as a multi-rotor unmanned aerial vehicle. The drone α includes a grapple G or other package support which can grip the package P and release the package P when appropriately aligned with the interface 10, and with the drone α including sensors S thereon for alignment with the interface 10 for successful release of the package P into the interface 10 (along arrow A of FIG. 5). The interface 10 can optionally be configured to appear as a chimney 20 and optionally be coupled to a house H or other residential structure (FIGS. 1 and 2) to provide an elevated and secure portal for package P delivery from a drone α.

In essence, and with particular reference to FIG. 1, basic details of the interface 10 are described according to a preferred embodiment. The interface 10 in this preferred embodiment is configured as a chimney 20 coupled to a house H. Instead of functioning as an exhaust for fireplace gases (or augmented with two columns for both package P delivery and exhaust gas functions), the chimney 20 functions to receive packages P from drones a. A cover 30 is preferably provided overlying an upper end 22 of the chimney 20. This cover 30 can pivot (along arrow B) to allow for selective access to the upper end 22 of the chimney 20 (FIG. 2).

Figure 4:
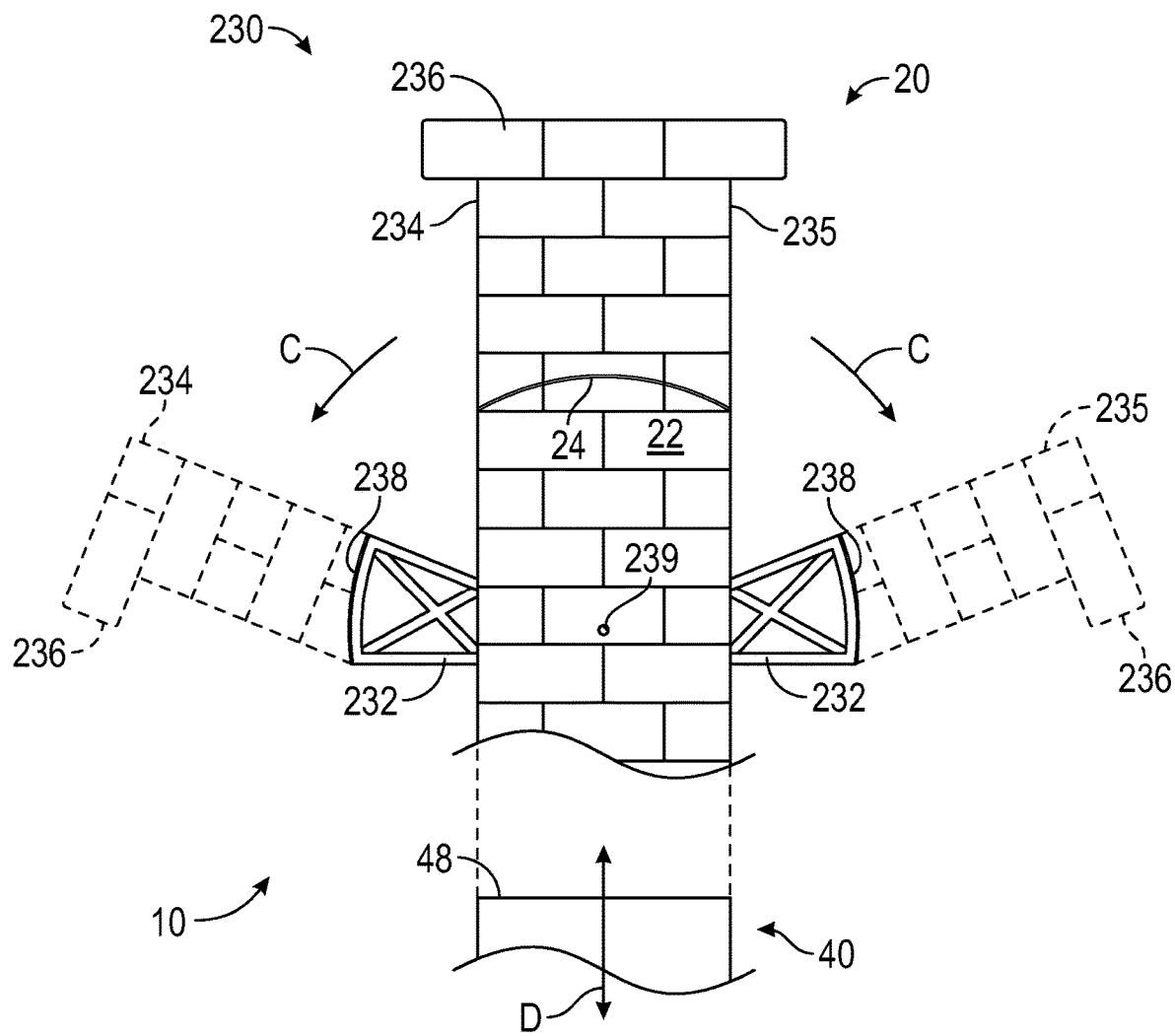
FIG. 4 is a front elevation view of a further alternative cover of that which is shown in FIG. 3, but with the cover having a brick chimney appearance and configured to split into two separate halves for exposing of an upper end of a shaft of a drone package delivery interface.
Figure 5:
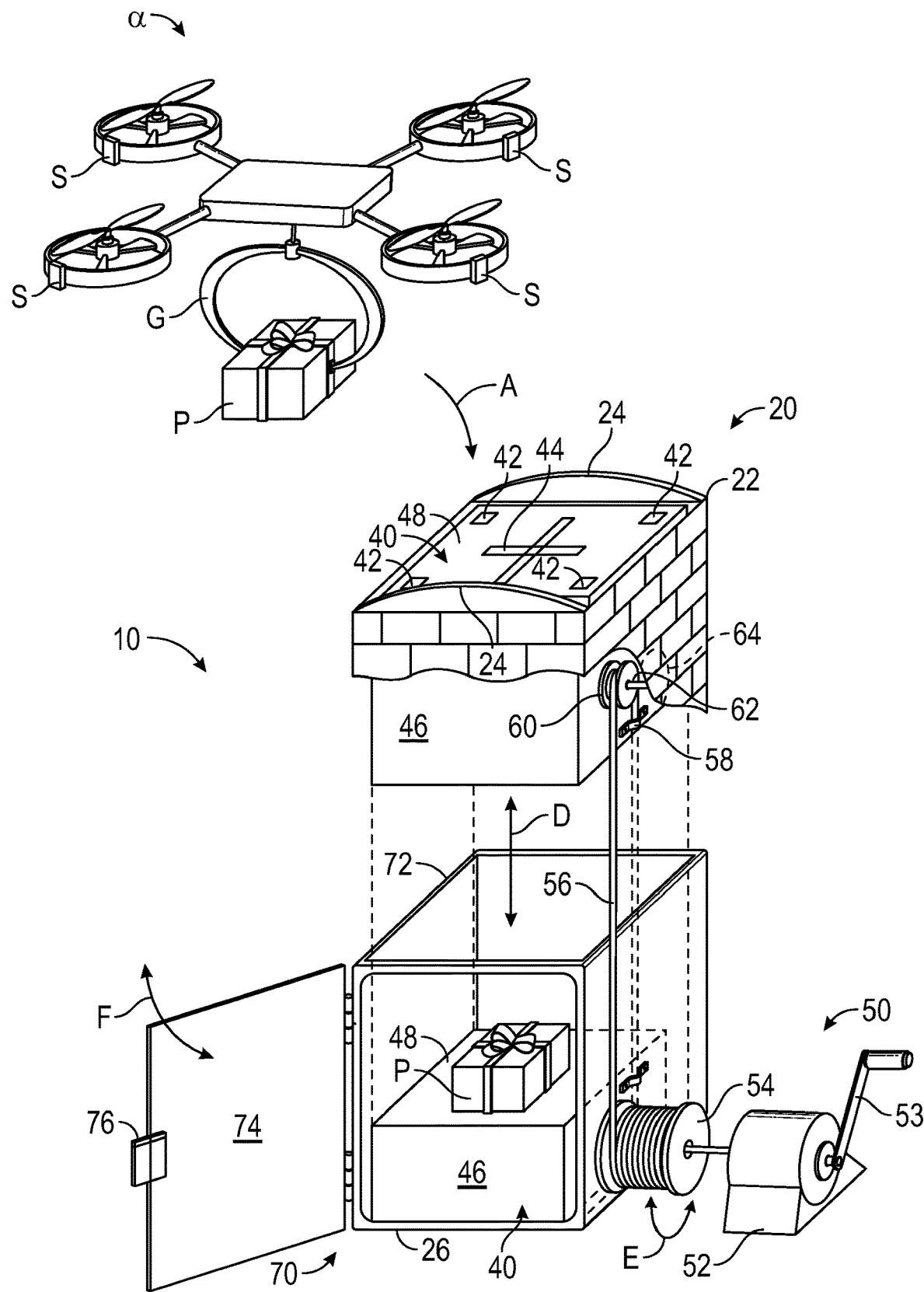
FIG. 5 is a perspective view of an elongate vertically extending shaft of a drone package delivery interface which also shows a lift mechanism for a platform passing within a hollow column of the shaft and with a locker at a lower end thereof, as well as a winch for powering the platform. This figure also shows a drone in the process of aligning with and placing a package upon the platform at the upper end of the drone package delivery interface.

In one embodiment, a platform 40 moves within a hollow column inside of the chimney 20 (FIG. 5). This platform 40 can have a package P placed thereon by a drone α (FIG. 5). The platform 40 then moves down (along arrow D of FIGS. 1-5) moving down to an access port at a lower end 26 of the chimney 20. A lift 50 acts as a mechanism for lowering of the platform 40 and return of the platform 40 back to an elevated position. A locker 70 can optionally be provided at the access port at the lower end 26 of the interface 10. The locker 40 keeps the package P secure and can restrict access only to the authorized final recipient for the package P. As an alternative to the platform 40, a chute could be provided which would allow the package P to fall by gravity from the upper end 22 down to the lower end 26 of the hollow column within the chimney 20.

Figure 2:
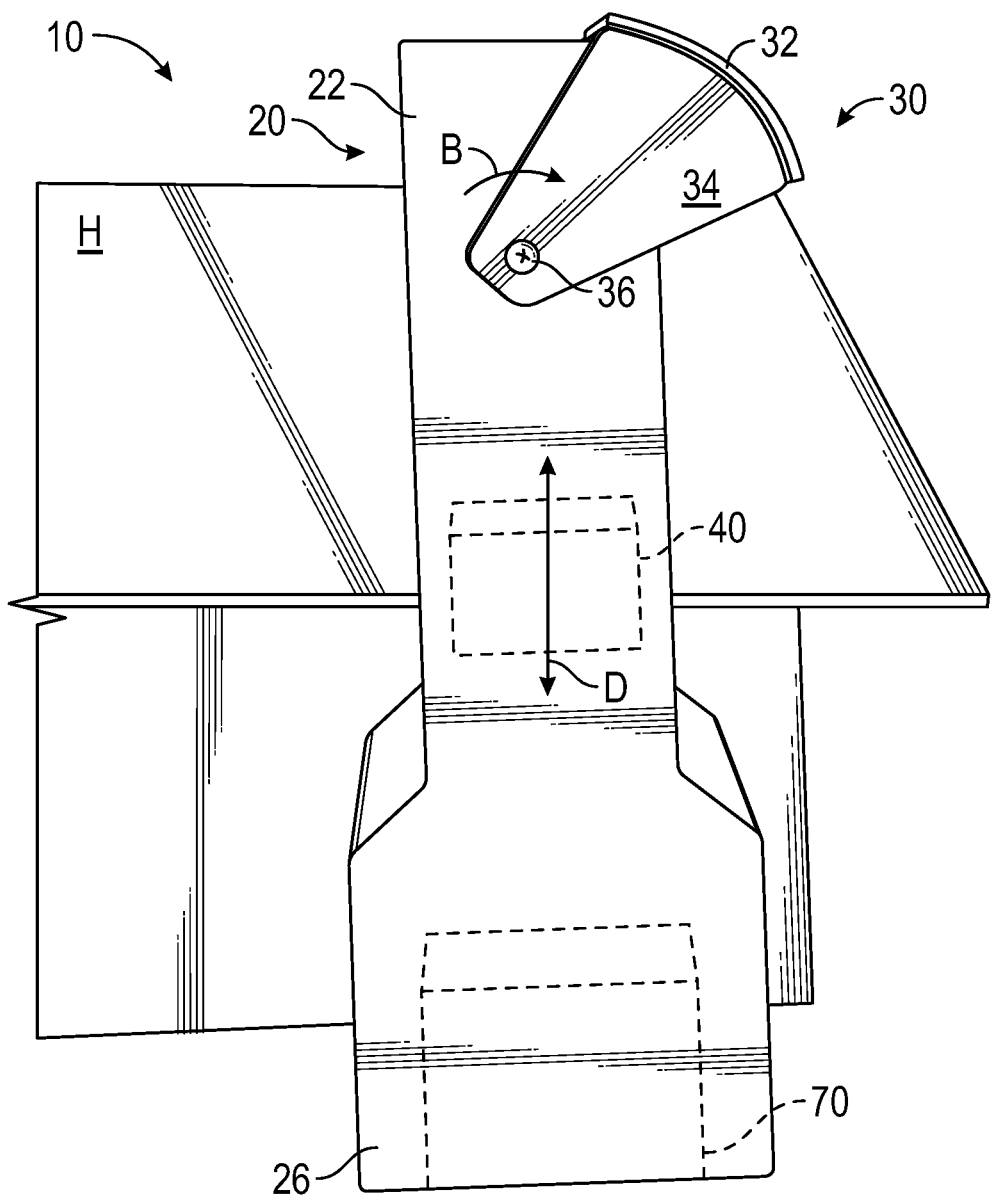
FIG. 2 is a perspective view similar to that which is shown in FIG. 1 but with the cover pivoted to an at least partially open position for receipt of a package delivered from a drone.

More specifically, and with initial reference to FIGS. 1 and 2, specific details of the chimney 20 and cover 30 are described according to a preferred embodiment. The chimney 20 is referred to as a "chimney" because in this preferred embodiment it has the appearance of a "chimney." Most preferably, this chimney 20 does not function to exhaust gases from a fireplace within the house H. Rather, it is only caused to appear like a "chimney." Such disguised appearance is beneficial in that various neighborhood rules can be restrictive as to what kind of appearance and structures can be built into houses H and other residential structures. Generally, chimneys are considered to be an acceptable architectural feature on a house, such that an interface 10 having the appearance of a chimney will often be acceptable. It is also desirable that the chimney 20 be as high as practical to minimize potential for tampering by vandals, minimize risk of burglars gaining access into the house H through the chimney 20, and to minimize potential for drone α collisions with adjacent trees, power poles, telephone poles and other elevated structures when accessing the upper end 22 of the chimney 20. Furthermore, the drone α can stay at a higher altitude where it is less likely to be interfered with by vandals during a package delivery procedure.

While the shaft of the interface 10 is referred to as the chimney 20, in other embodiments, while still referred to as the chimney 20, this shaft could have an appearance which is not particularly evocative of a "chimney" and still function as a shaft for purposes of this invention and delivery of a package P from an upper end 22 thereof down to a lower end 26 thereof. The chimney 20 is preferably vertical in orientation with the upper end 22 directly above the lower end 26. As an alternative, the chimney 20 could be oriented slightly (or to a great extent) away from vertical with the upper end 22 offset from the lower end 26. For instance, the upper end 22 could be elevated above the lower end 26 but diagonally offset therefrom with a slide extending from the upper end 22 down to the lower end 26, so that a package would slide from the upper end 22 to the lower end 26 and the diagonal orientation thereof would tend to keep the package P from accelerating to too great of a speed before reaching the lower end 26. If such diagonal sloping is desired but the upper end 22 is desired to be located mostly above the lower end 26, a spiraling path between the upper end 22 and lower end 26 could be provided, or some other form of zig-zag downward path could be provided between the upper end 22 and lower end 26.

Some form of hollow column is provided between the upper end 22 and lower end 26. In one simple embodiment this hollow column is merely open as a chute and a package P can merely be allowed to fall down through this chute through the hollow column. In other embodiments a platform 40 (FIG. 5) can be provided for lowering of a package P down from the upper end 22 of the chimney 20 down to the lower end 26 of the chimney 20 in a controlled fashion.

Figure 3:
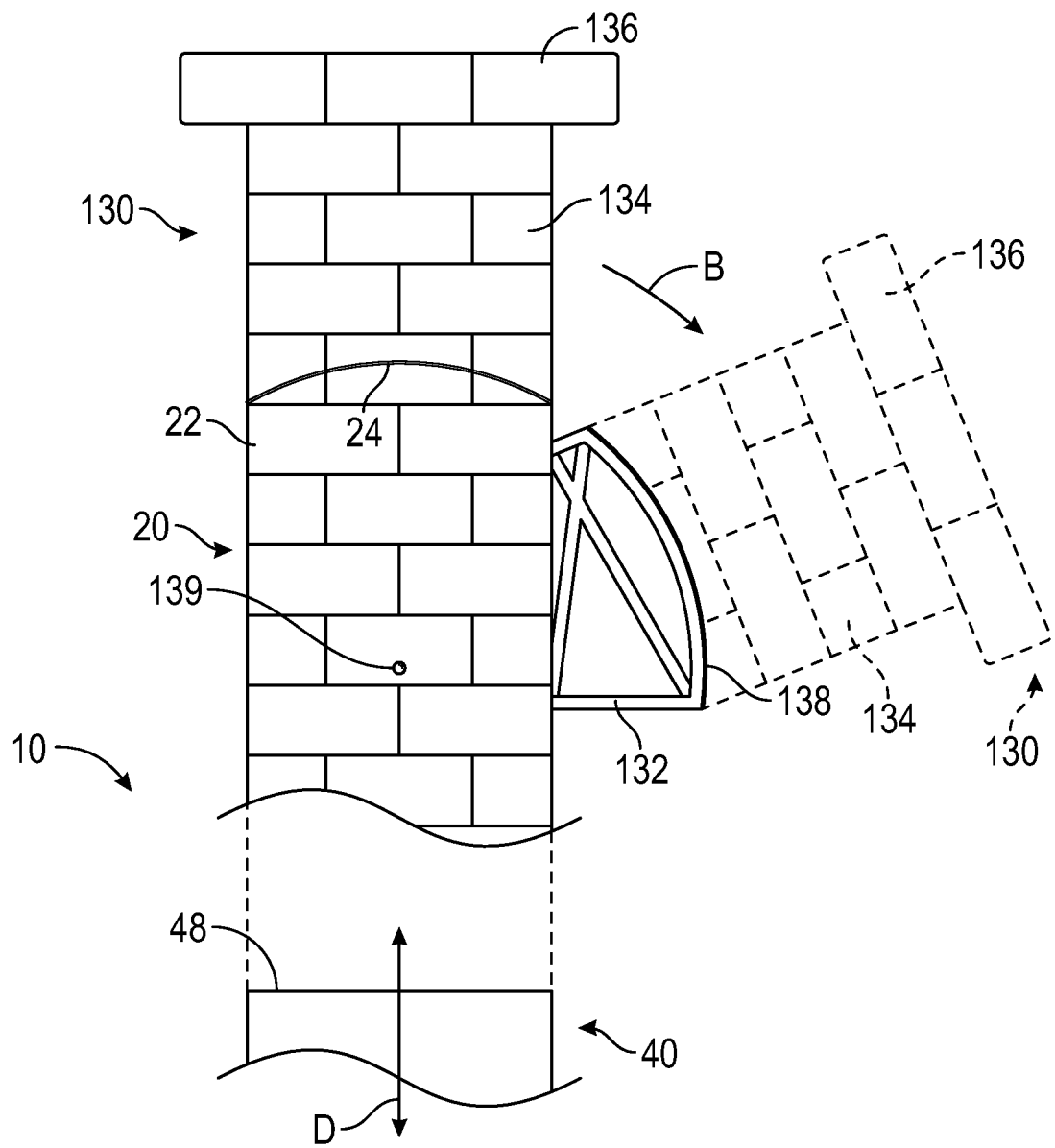
FIG. 3 is a front elevation view of an upper portion of an interface according to one embodiment of this invention appearing as a chimney and with upper portions of the chimney configured as a cover with the cover shown pivoted to an open position in broken lines.

The chimney 20 in one embodiment includes a rail 24 adjacent to the upper end 22. This rail 24 allows a cover 30 to interface therewith while the cover 30 moves from a closed position overlying the upper end 22 to an open position at least partially exposing the upper end 22. In the embodiment of this invention depicted in FIGS. 1 and 2, such a rail 24 might not be needed if the entire cover 30 can suspend from a pivot 36. In the embodiments depicted in FIGS. 3 and 4, such a rail 24 is shown adjacent to the upper end 22 in the form of a curving surface. Appropriate flashing can be provided on the portions of the cover 30, 130, 230 above the rail 24, and in the rail 24 so that hard driving rain does not penetrate into an interior of the chimney 20, but rather is precluded by flashing interfacing at this rail 24 (FIGS. 3 and 4). The rail 24 can thus both bear portions of a weight of the cover 30 through direct contact through the rail 24, or the rail 24 can merely be configured as a flashing structure for water (and debris) penetration preclusion at this seam between the cover 30 and other portions of the chimney 20.

In FIGS. 1 and 2 a cover 30 is disclosed according to a first embodiment. This cover 30 includes a cap 32 which is a semi-cylindrical structure in this embodiment, sized large enough to completely overlie the upper end 22 of the chimney 20. Arms 34 are provided extending down from this cap 32 to a pivot 36. Each of the arms 34 pivot laterally in a curving direction about the pivot 36 (along arrow B of FIGS. 1 and 2). While a front one of the two arms 34 is clearly seen, an identically formed arm 34 would also be provided on a rear side which is hidden by the upper end 22 of the chimney 20. While it is conceivable that only a single arm 34 could be provided, beneficially two such arms 34 help to balance and securely support the cover 30 overlying the upper end 22. The cap 32 of the cover 30 is preferably sufficiently oversized and close enough to the upper end 22 of the chimney 20 that it precludes rain and other debris from passing under the cap 32 of the cover 30 and into the upper end of the chimney 20. This cover 30 also sufficiently overlies the upper end 22 of the chimney 20 that it prevents burglars from being able to gain access into the house H by passing through the upper end 22 of the chimney 20 when the cover 30 is in the closed position (FIG. 1).

The pivot 36 of the cover 30 is preferably mounted to an electric motor or other actuator which is able to cause the entire cover 30 to pivot to the at least partially open position (FIG. 2, along arrow B). Most preferably, such control of pivoting of the cover 30 is provided from the drone α. In particular, when the drone α is approaching the interface 10, the drone α can send a wireless signal (e.g. an RF signal) which is received by the motor coupled to the cover 30 which signal causes the cover 30 to transition from the closed position (FIG. 1) to the open position (FIG. 2). After a package P has been released from the drone α and into the upper end 22 of the chimney 20, the drone α can signal the cover 30 to return to its closed position, or the presence of the package P within the upper end 22 of the chimney 20 (or elsewhere within the interface 10) can trigger closure of the cover 30. In this way, the cover 30 remains in its closed orientation (FIG. 1) except when it is needed to be opened for a package delivery procedure.

Referring to FIG. 3, details of an alternative embodiment brick cover 130 are provided as an alternative to the cover 30. The brick cover 130 is configured with a unique appearance to allow an upper end of the interface 10 to appear as an upper end of a brick chimney. This brick cover 130 includes a structure 132 which has a facade 134 at an upper portion thereof and cap 136. The facade 134 and cap 136 are made to appear as an upper end of a typical brick chimney in this embodiment. In other embodiments, the facade 134 and cap 136 could have other appearances to match the house H architecture, including stucco, stone, wood, etc. Thus, they include actual brick, or brick veneer or materials which look like brick but might be formed of plastic or other non-brick materials. When the brick cover 130 is in the closed orientation, one cannot readily tell that the brick cover 130 is anything other than an upper end of a chimney.

A rail 138 is preferably provided at a transition between the facade 134 and the structure 132 which carries the brick cover 120 upon a pivot point 139. This rail 138 can carry some of the weight between the brick cover 130 and the upper end 22 of the chimney 20. The rail 138 can also or alternatively act as a flashing structure to prevent penetration of water and/or debris into the upper end 22 of the chimney 20 adjacent to this interface between the brick cover 130 and the upper end 22 of the chimney 20.

A pivot motor would typically be coupled to either the structure 132 or to the pivot point 134, such as an axle to which the structure 132 is pivotably attached, for rotation of the brick cover 130 (along arrow B) from the closed position (shown in solid lines) to the open position (shown in broken lines) and vice versa. FIG. 3 also depicts how a hollow column within an interior of the chimney 20 adjacent the upper end 22 extends down through the chimney 20 and allows for a platform 40 to pass therethrough (along arrow D) or which could alternatively merely have a chute for dropping of packages P down through the hollow column within an interior of the chimney 20.

With particular reference to FIG. 4, details of a further alternative split brick cover 230 are described. This split brick cover 230 has an appearance when closed similar to that of the brick cover 130 (FIG. 3). However, the split brick cover 230 splits a facade thereof into a left half 234 and right half 235 which each include portions of a cap 236 at upper portion thereof. Structures 232 pivotably attach to pivots 238 and have the left half 234 and right half 235 coupled thereto. A rail 238 is provided on each of these halves 234, 235, typically at a transition to the structures 232 which carry the halves 234, 235. This rail 238 can act to carry a portion of the weight between the split brick cover 230 and the upper end 22 of the chimney 20, and/or can merely act as a flashing interface to preclude penetration of water and/or debris through this transition between the split brick cover 230 and the upper end 22 of the chimney 20.

In this embodiment, when the interface 10 is to be opened to allow for a package P to be delivered from a drone α, a signal is received and interacts with a motor coupled to the halves 234, 235 of the split brick cover 230, causing these halves 234, 235 to move away from each other (along arrow C of FIG. 4) and leaving the upper end 22 of the chimney 20 open and ready for receipt of a package P from a drone α. A hollow column is provided within the chimney 20 and extending down from the upper end 22 which can allow a platform 40 (or alternatively merely just an open chute) to transport a package P down through the hollow column (such as along arrow D of FIG. 4).

With particular reference to FIG. 5, details of a platform 40 and lift 50 mechanism, as well as an optional locker 70 are described according to one embodiment of this invention. In this embodiment, a platform 40 carries a package P from an upper end 22 of the chimney 20 down to an access port such as in the form of a locker 70 adjacent a lower end 26 of the chimney 20. The platform 40 could be dispensed with and the chimney 20 merely left with an open hollow column to allow packages P to fall down from the upper end 22 to the lower end 26. In such a configuration baffles, padding or other structures could be provided to protect the packages from damage from coming into contact with hard surfaces at too great of a velocity. One advantage of a platform 40 is that packages P can not only be received into the interface 10 more gently, but also can potentially be returned back up from the interface 10 back to a drone α, such as when it is desired to return a package P, such as when defective merchandise or unwanted merchandise has been delivered. As one option, the platform 40 could be used only for returns and the hollow column can act as an open chute with the platform 40 adjacent to the lower end 26 of the chimney 20.

The platform 40 in this embodiment includes sensors 42 at corners of a surface 48 at an upper portion of a body 46 of the platform 40. Alignment markings 44, in this embodiment shown as an "X" provides one example of an alignment marking. The alignment marking 44 is configured so that it can be one form of indicia which can be visually perceived by a camera or other machine vision sensor on the drone α and recognized as a central position on the surface 48 of the platform 40, for proper positioning and orientation of the drone α before release of the package P onto the surface 48 of the platform 40.

The sensors 42 could be sensors which would detect the presence and position of the drone α and could signal to the drone α that the drone α is properly positioned and that it is okay for the drone α to release the package P. A variety of different protocols could be followed for the process of aligning the drone α with the platform 40 or other structures at the upper end 22 of the chimney 20 and to provide the package P release command. At one extreme the drone α controls as much of the process as possible and instead of sensors 42 on the platform 40, alignment markings 44 of a totally passive variety (e.g. bar codes, QR codes or other indicia) are relied upon and detected by the drone α for confirmation of position and orientation before releasing of the package P.

In one example such alignment markings 44 could be similar to the form of "QR codes" which are known to be utilized by cameras and recognized efficiently to allow the drone α to precisely know its position and orientation relative to the platform 40 or other structures at the upper end 22 of the chimney 20. These details could include the precise distance of the drone α vertically above the platform 40 or other portions of the upper end 22 of the chimney 20, as well as a precise distance laterally in a first direction and laterally in a second direction. These three (X, Y and Z) coordinates could each represent an offset of the package P away from a center of the platform 40 or central portion of the upper end 22 of the chimney 20. The drone α could continue to make adjustments in position and orientation until these offsets are at zero or are within some acceptable range of parameters.

With regard to orientation, in one embodiment the drone α does not need to be properly oriented rotationally but merely can deliver a package in any orientation. In other embodiments it is desirable that the drone α be aligned orientationally, such as with fingers of a grapple G aligned parallel with and at a midpoint distance between the rails 24 at the upper end 22 of the chimney 20. Such an orientation could be detected by relationship to a rotational angle about a vertical Z-axis and have an acceptable range of orientations and unacceptable ranges of orientations. The drone α would yaw laterally until it has an acceptable orientation. When the drone α detects that it is in a proper position and/or orientation, the signal is sent to the grapple G to release the package P. Other forms of drones could have structures other than grapples G for final release of the package P. For instance, the package P could be held within a compartment that it closed by doors adjacent thereto. The doors would merely open to release the package P. Other forms of package P release mechanisms could also be incorporated into the drone α.

In other embodiments, the system can be more heavily controlled by the platform 40 or other portions of the interface 10, with the drone α being controlled to some extent by portions of the system associated with the interface 10. For instance, the sensors 42 on the platform 40 could detect the position and orientation of the drone α and when this position and orientation is within acceptable parameters the signal for release of the package P can be given to the drone α and the drone α can comply to signals received from the interface 10. Other alternative systems could divide up these duties in various different manners. Preferably, the interface 10 of this invention is configurable to be compatible with a standardized package delivery system so that one or multiple major package delivery services would have compatible systems for working with the interface 10 according to a standardized set of protocols developed by such an overall system operator.

Once the package P has been placed onto the surface 48 of the platform 40, the platform 40 is ready to be lowered. A lift 50 provides a preferred form of mechanism for lowering of the platform 40 from the upper end 22 down to the lower end 26. This lift 50 in this preferred embodiment includes a winch 52 adjacent to the lower end 26 of the chimney 20. The winch 52 can optionally have a hand crank 53 coupled thereto, such as for operation of the platform 40 when power goes out to the winch 52, or to provide a simpler system. A spool 54 is coupled to the winch 52 and has cable 56 wrapped thereon. Portions of this cable 56 (or other line) extend up from the spool 54 over a pulley 60 and then attach at an attachment 58 to the platform 40, such as on a side of a body 46 of the platform 40 beneath the surface 48.

Figure 6:
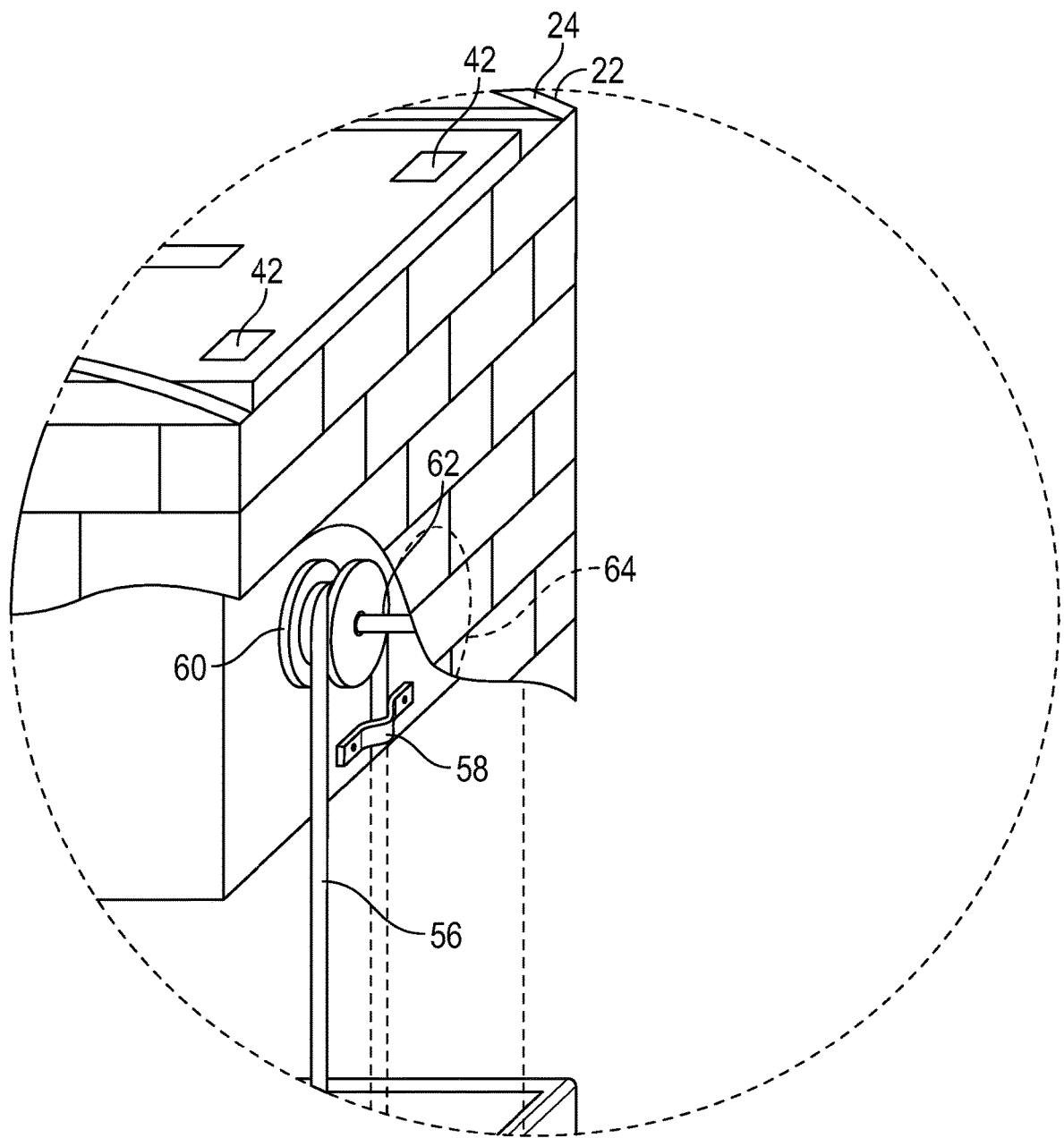
FIG. 6 is a detail of a portion of that which is shown in FIG. 5, showing further details of the pulley portion of the lift for the platform.

The pulley 60 is rotatably supported, such as through an axle 62 to a rotary support block 64 affixed to the chimney 20 adjacent to the upper end 22 (see FIGS. 5 and 6). This pulley 60 is not affixed to the platform 40 in this embodiment. Rather, only the attachment 58 end of the cable 56 is attached to the platform 40. Thus, as cable 56 is played off of the spool 54 through rotation of the winch 52 (along arrow E of FIG. 5) the cable 56 moves up and over the pulley 60 and a distance from the pulley 60 down to the attachment 58 increases as the platform 40 moves downward. Rails, wheels or other guides can be provided within the hollow column along which the platform 40 can slide (or roll) to keep the platform 40 aligned precisely and to avoid jamming as it moves downwardly. As more cable 56 is played off of the spool 54 by rotation of the winch 52, the platform 40 eventually reaches the lower position at the lower end 26 of the chimney 20.

Most preferably, the lower end 26 of the chimney 20 is contained within a locker 70 providing a preferred form of access port for packages P after they have been received into the interface 10. This locker 70 includes an enclosure which is only open on an upper portion thereof to allow the platform 40 to pass thereinto. The locker 70 could also function with a chute and without a platform 40. Otherwise, the enclosure 72 encloses different sides of the locker 70 preferably with a containment structure which is sufficiently secure to prevent unauthorized access to an interior thereof. A door 74 is provided on one surface of this locker 70. This door 74 is most preferably within an interior of the house H to provide additional security, but could be on an exterior of the chimney 20. A lock 76 is preferably provided on the door 74 which locks the door 74 and precludes access to an interior thereof.

In one embodiment this lock 76 has a keypad which allows for a code to be entered thereinto which can unlock the locker 70 door 74. As an example, when someone orders a package P to be delivered, an email would be sent to the intended recipient including a unique code for unlocking of the locker 70. When the drone α delivers the package P, the drone α can also communicate by a secure communication the code for the locker door 74 which will allow the lock 76 to be unlocked. The lock 76 resets itself so that it cannot be opened unless the same code is entered. The supplier of the package P sends an email or other communication to the intended recipient which includes the code for unlocking of the door 74. The user thus can review the email or other message and use the information therein to provide the appropriate code to unlock the lock 76 and open the door 74, and then gain access to the package P, such as by rotation of the door 74 along arrow F of FIG. 5. When opened, a signal can be sent back to the sender to confirm package P receipt and optionally have an email sent to the recipient to verify that the recipient got the package. Such a lock 76 can also be a safety feature in that it can keep children or other unauthorized individuals from playing with or placing undesired articles into or upon the platform 40 or within the hollow column.

While the interface 10 is shown in the preferred embodiment herein attached to a house H, it could be attached to other residential structures such as apartment buildings. It is conceivable that such an interface 10 could be shared by multiple tenants within an apartment building or multiple residents within a townhouse or other multi-unit dwelling (e.g. a condominium). One or more such interfaces 10 could be associated with such a structure. In one embodiment, the structure might have multiple different floors and the platform 40 could be configured somewhat like a dumbwaiter being able to stop at different levels. In one embodiment, packages P can be taken off of the platform 40 and slid into a locker 70 adjacent to the hollow column and then the platform 40 can move back up to the upper end 22 for receipt of future packages which can be delivered to different floors. Multiple such interfaces 10 could be provided within each structure with the capability to stop at multiple different floors, so that high density housing can still allow for secure package delivery thereto. With such a community interface 10, the importance of providing a lock 76 on the locker 70 is increased, both to ensure that the package P is delivered to the proper final recipient, as well as for safety in avoiding tampering therewith. While such systems in multi-family housing would often not be configured as in the appearance of a chimney, such an appearance could be provided if desired.

In a further embodiment, a chimney-like appearance is maintained but the interface 10 is provided separate from a house H. For instance, the entire interface 10 could be in the appearance of an outdoor fireplace which is often provided in a backyard setting separate from a house H. In such an embodiment, all of the same features described above with respect to various different embodiments of the interface 10 could be provided, but the interface 10 would merely not be attached to a house H. While the interface 10 typically would not function as a gas exhaust for an actual fireplace, it is conceivable that the shaft of the chimney 20 could have multiple different conduits extending vertically therethrough with one of the conduits being for exhaust gases of a fireplace and with another of the conduits being in the form of the hollow column for passage of packages P therethrough. Appropriate barrier walls between these two columns would be provided so that the hot gas exhaust function of the chimney as well as the package delivery function could both be adequately performed. Thus, the chimney 20 could provide the dual purpose of fireplace gas exhaust as well as package delivery.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A drone package delivery interface, comprising in combination:
    an elongate shaft having an upper end opposite a lower end and with a hollow column therebetween;
    a movable cover selectively overlying and exposing said upper end of said shaft;
    an access port adjacent to said lower end of said shaft; and
    wherein said movable cover includes a cap sized at least as large as said hollow column adjacent to said upper end, said cap pivotable about an axis spaced from said upper end between a closed position overlying said hollow column adjacent said upper end to an open position with said cap of said cover exposing at least a portion of said hollow column adjacent to said upper end.

2. The interface of claim 1 wherein a movable platform is located within said hollow column, said movable platform moving substantially vertically within said column between said upper end of said shaft and said access port.

3. The interface of claim 2 wherein a winch is coupled to said movable platform, said movable platform moving vertically when said winch rotates.

4. The interface of claim 3 wherein a cable extends from said winch to said movable platform with said cable routed over a pulley, said pulley rotatably supported by said elongate shaft, said cable being drawn onto a spool coupled to said winch when said winch rotates, causing a length of cable extending up over said pulley and down to said platform to be decreased, thus elevating said movable platform by winch rotation.

5. The interface of claim 1 wherein at least one sensor system is provided including portions thereof configured to interact with a package delivery drone and portions thereof adjacent to upper portions of said shaft adjacent to said upper end, said sensor system facilitating alignment of the drone with said upper end of said shaft.

6. The interface of claim 5 wherein said at least one sensor system includes at least one sensor configured to interact with the drone and at least one indicia affixed to a portion of said interface, said sensors configured to identify said indicia for alignment of the drone with said interface and control of release of a package from the drone when said sensors on the drone detect said indicia as being sufficiently close and properly positioned for successful release of the package into said interface.

7. The interface of claim 6 wherein said at least one sensor includes a visual sensor and wherein said at least one indicia includes a visible indicia, said visible indicia configured to be recognized by said visual sensor.

8. The interface of claim 1 wherein a locker is provided adjacent to said lower end, said locker including a door with a lock thereon, said door providing selective access to an interior of said locker adjacent to said lower end of said shaft for collection of packages passing along said hollow column from said upper end to said lower end.

9. A drone delivery interface, comprising in combination:
an elongate shaft having an upper end opposite a lower end and with a hollow column therein;
an access port adjacent to said lower end of said shaft;
wherein a movable cover selectively overlies and exposes said upper end of said shaft; and
wherein said movable cover includes a cap sized at least as large as said hollow column adjacent to said upper end, said cap pivotable about an axis spaced from said upper end between a closed position overlying said hollow column adjacent said upper end to an open position with said cap of said cover exposing at least a portion of said hollow column adjacent to said upper end.

10. The drone delivery interface of claim 9 wherein a movable platform is positioned within said hollow column, said movable platform movable between adjacent to said upper end and adjacent to said access port at said lower end.

11. The interface of claim 1 wherein said cap has an external appearance matching that of an upper portion of a chimney, and wherein said elongate shaft has an external appearance matching that of portions of a chimney below said upper portion, with said external appearance of said cap and said external appearance of said elongate shaft matching each other to give a combined appearance of a fireplace chimney.

12. The interface of claim 11 wherein said elongate shaft is built into a residential structure with said lower end within an interior of said residential structure.

13. The interface of claim 12 wherein said cap is located above a roof of said residential structure.

14. The interface of claim 13 wherein said cap is a single structure, with all portions thereof pivoting together as a unit.

15. The interface of claim 9 wherein said cap has an external appearance matching that of an upper portion of a chimney, and wherein said elongate shaft has an external appearance matching that of portions of a chimney below said upper portion, with said external appearance of said cap and said external appearance of said elongate shaft matching each other to give a combined appearance of a fireplace chimney.

16. The interface of claim 15 wherein said elongate shaft is built into a residential structure with said lower end within an interior of said residential structure.

17. The interface of claim 16 wherein said cap is located above a roof of said residential structure.

18. The interface of claim 17 wherein said cap is a single structure, with all portions thereof pivoting together as a unit.

* * * * *